J. Danner,
Clothes Drier,
N° 39,340.  Patented July 28, 1863.
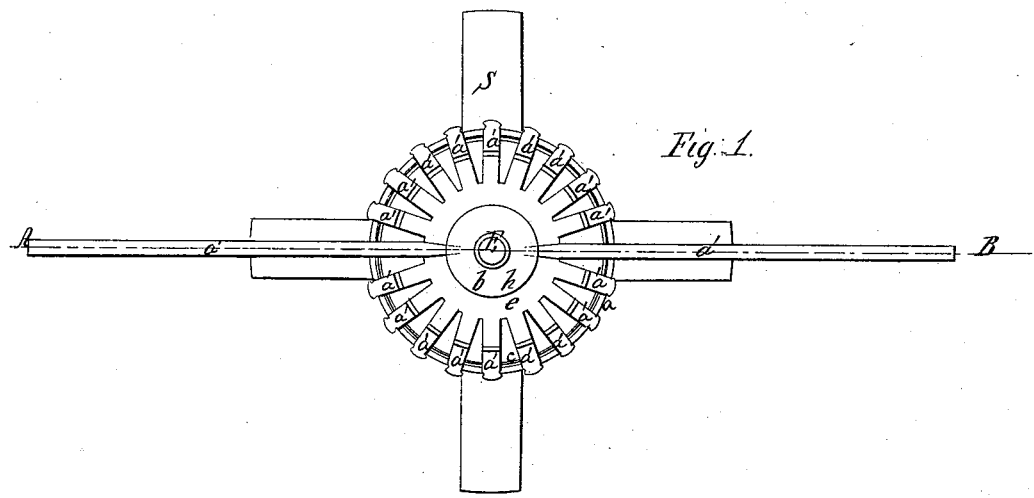
Fig. 1.
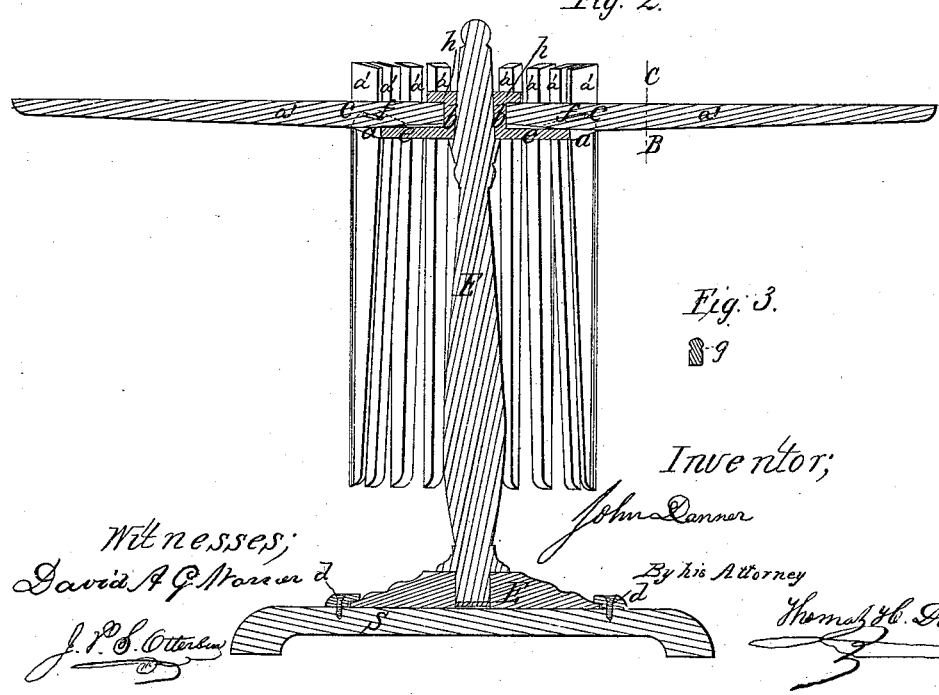
Fig. 2.
Fig. 3.
Inventor;
John Danner
By his Attorney
Thomas H. Dodge
Witnesses;
David A. G. Warner
J. P. S. Otterbein

UNITED STATES PATENT OFFICE.

JOHN DANNER, OF CANTON, OHIO.

IMPROVED CLOTHES-FRAME.

Specification forming part of Letters Patent No. 39,340, dated July 28, 1863.

*To all whom it may concern:*

Be it known that I, JOHN DANNER, of Canton, in the county of Stark and State of Ohio, have invented certain new and useful Improvements in Clothes-Frames; and I do hereby declare that the following is a full, clear, and exact description of the same, reference being had to the accompanying drawings, forming a part of this specification, and in which—

Figure 1 represents a top or plan view of my said clothes-frame with two of the folding arms extended. Fig. 2 represents a section on line A B, Fig. 1. Fig. 3 represents a section of one of the arms on line C D, Fig. 2.

In the drawings, E represents the stand, and upon the top of which the revolving arm-supporting piece $b$ is fitted to turn, as indicated in the drawings. F is the supporting-base to standard E, and which, when desired, can be placed upon a platform or stand, S, and retained in position by buttons $d$. The revolving arm-piece $b$ I prefer to make of cast metal. It has a wide bottom flange, $e$, from the periphery of which rises a series of projections, $a$, having a small groove on their upper outer edge, in which a wire, $c$, fits, the latter being bent into circular form. Upon the wire $c$ and between the projections $a$ are hung a a series of arms, $a'$, which, when not in use, can be folded down in a vertical position or extended and held in a horizontal position, as fully indicated in the drawings. A cross-section of the arms shows them to be grooved out on both sides, as seen at $g$, Fig. 3.

The operation is as follows: The frame having been located in any proper position, whether in doors or out, the operator raises one of the arms into a horizontal position and then slides its inner end under the upper flange, $h$, of piece $b$, and attaches the clothes to the arm by pins the same as to an extended cord or line. After one arm, A, is covered, the piece $b$ is turned until another arm is brought into position, when that is in turn raised and covered, and the operation continued as long as desired or until all of the arms are covered. It will be seen that the arms are free to turn in a horizontal position, so that the operator can fill the entire frame without walking but a few steps, and can also examine and remove any particular article in the same manner. While the clothes are not liable to injury by strong winds, they are, nevertheless, well exposed, so as to facilitate drying. In some cases one-half of a circle of arms may be used with advantage and the arm-piece supported by a standard extended out from the side of a building or room, or the arm-piece may be fastened permanently, although as a general rule I prefer the plan represented in the drawings. The arms are provided with an inclined slot, $f$, through which the wire $c$ is passed. This slot, in addition to allowing the arms to be slipped in and out from under the flange $h$ of the pins $b$, prevents by its incline the arms from working out and falling down into a vertical position when covered with clothes. They are readily drawn out, however, by the operator, who has only to elevate the outer end a little. Other modes may be adopted for keeping the arms in place in either position, although I prefer those shown in the drawings.

Having described my improvements, what I claim as my invention, and desire to secure by Letters Patent, is—

The combination of the arms $a'$, having small inclined grooves $f$, with the revolving head $b$ and circular wire $c$, constructed, arranged, and operated substantially in the manner and for the purposes described.

JOHN DANNER.

Witnesses:
 JOSEPH RIEGLER,
 JOHN M. SCHNEIDER.